United States Patent [19]
Denison

[11] Patent Number: 5,894,012
[45] Date of Patent: Apr. 13, 1999

[54] METHOD AND SYSTEM FOR RECOVERING MARKETABLE END PRODUCTS FROM WASTE RUBBER

[75] Inventor: Gilbert W. Denison, 3750 W. Main, Norman, Okla. 73072

[73] Assignee: Gilbert W. Denison, Norman, Okla.

[21] Appl. No.: 08/420,848

[22] Filed: Apr. 10, 1995

Related U.S. Application Data

[60] Continuation of application No. 08/315,032, Sep. 29, 1994, abandoned, which is a division of application No. 08/109,182, Aug. 19, 1993, abandoned.

[51] Int. Cl.$^6$ .................................................. A05B 3/02
[52] U.S. Cl. .................................................. 422/150
[58] Field of Search ........................................ 422/150

[56] References Cited

U.S. PATENT DOCUMENTS

| | | | |
|---|---|---|---|
| 1,938,116 | 12/1933 | Smith | 196/30 |
| 1,989,330 | 1/1935 | Moore et al. | 196/147 |
| 2,269,912 | 1/1942 | Ladoo et al. | 83/94 |
| 3,749,322 | 7/1973 | Reynolds | 241/24 |
| 3,755,152 | 8/1973 | Gulick | 208/307 |
| 3,893,913 | 7/1975 | Zimmerman | 208/253 |
| 3,978,199 | 8/1976 | Maruhnic et al. | 423/461 |
| 4,038,100 | 7/1977 | Haberman | 106/307 |
| 4,123,332 | 10/1978 | Rotter | 201/15 |
| 4,284,616 | 8/1981 | Solbakken et al. | 423/461 |
| 4,306,506 | 12/1981 | Rotter | 110/229 |
| 4,308,103 | 12/1981 | Rotter | 202/117 |
| 4,309,195 | 1/1982 | Rotter | 48/76 |
| 4,514,287 | 4/1985 | Ikematsu et al. | 208/309 |
| 4,647,443 | 3/1987 | Apffel | 423/449 |
| 4,666,591 | 5/1987 | Imai et al. | 209/38 |
| 4,740,270 | 4/1988 | Roy | 201/35 |
| 4,839,029 | 6/1989 | Ichikawa et al. | 208/251 R |
| 4,846,962 | 7/1989 | Yao | 208/301 |
| 4,864,012 | 9/1989 | Britt | 528/210 |
| 4,946,582 | 8/1990 | Torihata et al. | 208/251 R |
| 5,057,189 | 10/1991 | Apffel | 422/150 |
| 5,087,436 | 2/1992 | Roy | 423/461 |
| 5,095,040 | 3/1992 | Ledford | 521/40.5 |
| 5,120,767 | 6/1992 | Allard et al. | 521/40.5 |
| 5,157,176 | 10/1992 | Munger | 585/7 |

*Primary Examiner*—Timothy McMahon
*Attorney, Agent, or Firm*—McKinney & Stringer, P.C.

[57] ABSTRACT

An improved waste rubber processing system which pyrolyzes waste rubber to produce pyrolysis oil and carbon black and then purifies and refines these end products to broaden their commercial applications and to increase their market value. The pyrolysis oil purification system of this invention produces a high quality oil which is clear and colorless and which is marketable as a plasticizer or extender oil for rubber and plastic compounding applications. The carbon black purification system mills the carbon black to a fine grade and removes oversized contaminants such as fiberglass and ferrous particles to produce a low structure furnace black. The plasticizer/extender oil is many times more valuable than the end product of conventional pyrolysis systems which is a low quality fuel oil. Similarly, the low structure furnace black is of much greater value than the low grade carbon black produced by conventional pyrolysis systems. Thus, the present invention greatly improves the profitability of waste rubber processing and provides new sources for low structure furnace black and plasticizer/extender oil.

32 Claims, 3 Drawing Sheets

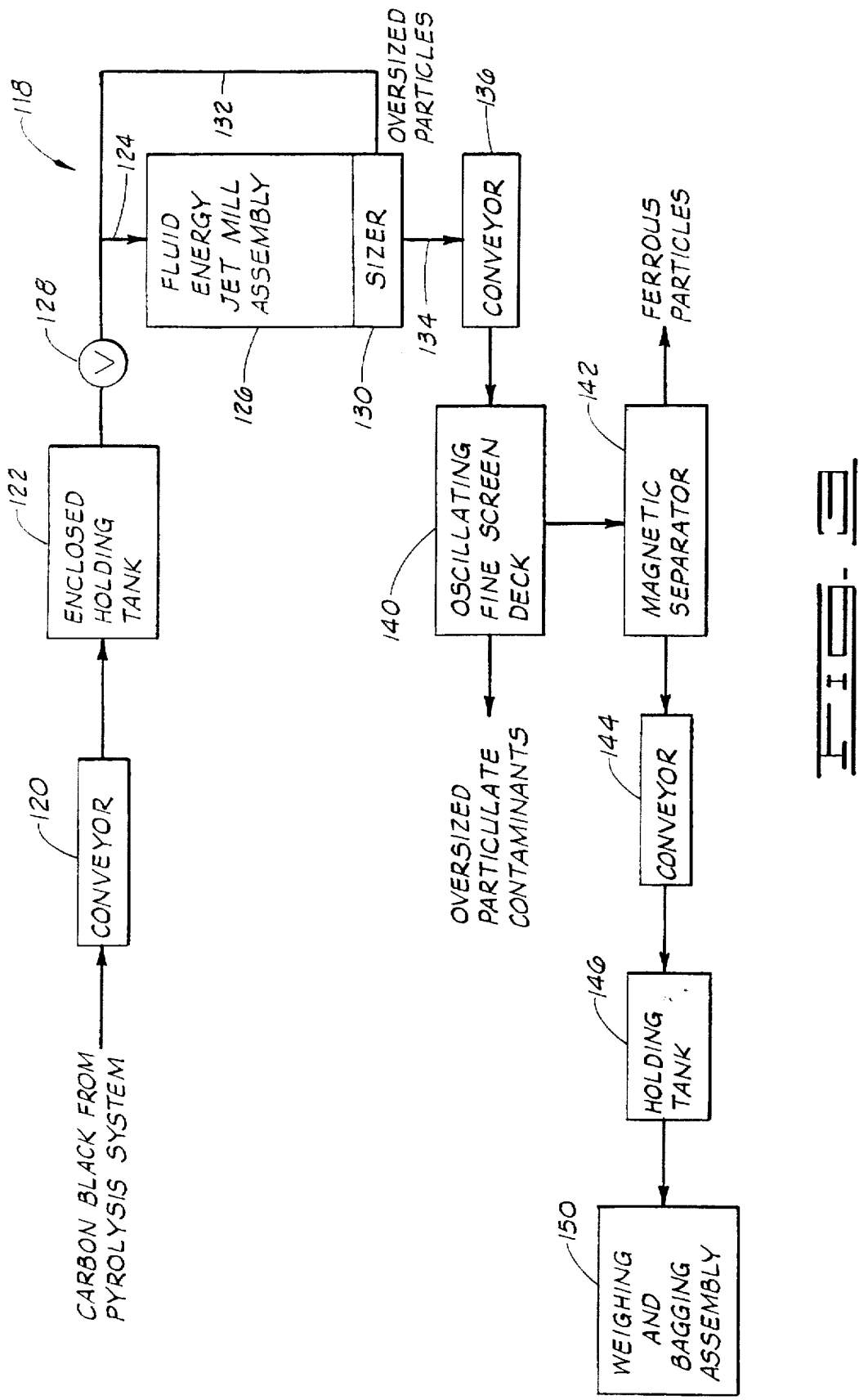

METHOD AND SYSTEM FOR RECOVERING MARKETABLE END PRODUCTS FROM WASTE RUBBER

This application is a continuation of U.S. application Ser. No. 08/315,032 filed Sep. 29, 1994, now abandoned, which is a divisional of U.S. application Ser. No. 08/109,182 filed Aug. 19, 1993, now abandoned.

FIELD OF THE INVENTION

The present invention relates generally to methods and devices for pyrolyzing waste rubber and for recovering marketable end products from waste rubber pyrolysis.

SUMMARY OF THE INVENTION

The present invention is directed to a method for recovering marketable end products from waste rubber. In accordance with the waste rubber processing method of this invention, waste rubber shreds first are pyrolyzed to produce pyrolysis oil and carbon black.

The carbon black is milled to produce carbon black particles of a selected average particle size. The milled carbon black then is screened to remove oversized contaminant particles. Ferrous contaminants are separated magnetically from the milled carbon black.

The pyrolysis oil is mixed with a filter aid selected to attract particulate contaminants. The mixing is carried out under conditions which permit the filter aid to form aggregates with the particulate contaminants. The filter aid/contaminant aggregates are removed from the pyrolysis oil. The pyrolysis oil also is filtered to remove colorant and colloidal contaminants.

The present invention comprises the practice of each of the above described methods for purifying and refining carbon black and for purifying pyrolysis oil practiced separately from the pyrolysis steps.

Still further, the present invention comprises a system for processing waste rubber. The system comprises a waste rubber pyrolysis system, a pyrolysis oil purification system and a carbon black purification and refinement system.

The pyrolysis system includes a hopper for containing waste rubber shreds. A deoxygenator receives waste rubber shreds from the hopper and removes oxygen from the waste rubber. A conveyor is provided for dispensing the waste rubber from the hopper to the deoxygenator at a controlled rate.

The pyrolysis system further comprises a pyrolysis vessel adapted to receive deoxygenated waste rubber from the deoxygenator and to pyrolyze the deoxygenated waste rubber. The pyrolysis reaction produces end products comprising pyrolysis oil and carbon black.

An oil/gas separator assembly is included and is adapted to separate the pyrolysis oil from the pyrolysis gas. A pyrolysis gas holding tank receives pyrolysis gas from the oil/gas separator assembly.

The pyrolysis system includes a carbon black screening assembly adapted to separate oversized contaminant particles from carbon black received from the pyrolysis vessel and to separate ferrous particles from carbon black.

The pyrolysis oil purification system comprises a pyrolysis oil holding tank which receives pyrolysis oil from the pyrolysis system. A mixing vessel receives pyrolysis oil from the pyrolysis oil holding tank and mixes the pyrolysis oil with a filter aid under conditions which permit particulate contaminants in the pyrolysis oil to form aggregates with the filter aid. A filter aid removal assembly receives the mixture of pyrolysis oil, filter aid and filter aid/particulate contaminant aggregates from the mixing vessel and removes the filter aid and filter aid/particulate contaminant aggregates from the pyrolysis oil. A colloidal/colorant removal assembly is included and it is adapted to receive the pyrolysis oil from the filter aid removal assembly and to remove colorant and colloidal contaminants from the pyrolysis oil.

The carbon black purification and refinement system of the waste rubber processing system of this invention includes an enclosed carbon black holding tank for receiving carbon black from the pyrolysis system. A mill receives the carbon black from the enclosed holding tank and mills the carbon black into particles of a selected average size. A valve dispenses carbon black from the enclosed holding tank to the mill at a controlled rate. A screening device separates oversized contaminants from the milled carbon black, and a magnetic separator removes ferrous particles from the milled carbon black. A carbon black storage vessel collects purified, milled carbon black.

Further still, the present invention comprises a carbon black purification system and a pyrolysis oil purification system apart from the waste rubber pyrolysis system.

BRIEF DESCRIPTION OF THE DRAWINGS

FIG. 3 is a diagrammatic illustration of a carbon black purification and refinement system in accordance with the present invention.

FIG. 4 is a diagrammatic illustration of a pyrolysis oil purification system in accordance with the present invention.

DETAILED DESCRIPTION OF THE PREFERRED EMBODIMENTS

Disposal of scrap tires is a growing concern in this country. Some 350 million tires are discarded annually. Most of these tires are disposed of in land fills after being quartered or shredded. Such tire scraps constitute about two percent of solid waste in the United States and about 164 million cubic feet per year of land fill space. Moreover, the buried tires represent over 90 million MMBTU's per year of wasted energy.

An alternate method of disposing of scrap tires is simply burning them. This does recover about one-third of the economic value. However, this method of disposal is not efficient.

Unfortunately, the rubber from scrap tires cannot be recycled directly into the manufacture of new tires because of the different types of rubber involved. A small portion, about fifteen percent, of the scrap tire rubber can be recycled as tire chips. However, this disposal method is limited in the amount of scrap rubber that can be processed and is relatively expensive due to the amount of liquid nitrogen the chip recycling process requires.

Pyrolysis of waste rubber offers great promise for disposal of waste rubber generally and scrap tires in particular. Pyrolysis provides an efficient, cost effective method for processing large volumes of waste rubber and recovering marketable end products. Conventional waste rubber pyrolysis produces three end products: pyrolysis oil, pyrolysis gas and carbon black. This pyrolysis oil is a low grade oil suitable as fuel oil. This pyrolysis gas typically is recycled in the pyrolysis process as fuel for the burners, or it may be sold as fuel. This carbon black is a coarse and impure grade of carbon black which requires further processing before it can be reused.

The present invention provides a waste rubber processing system which includes a waste rubber pyrolysis system, a carbon black refinement and purification system and a pyrolysis oil purification system. The carbon black refinement and purification system mills and purifies the carbon black to produce a low structure furnace black. This low structure furnace black has a much greater market value than the low grade carbon black produced by conventional pyrolysis and has a variety of commercial applications including the production of inks and adhesives, for example. The pyrolysis oil purification system and method produces a clear, colorless oil or "bright stock" which is marketable as a plasticizer and extender oil for rubber and plastic compounding processes. This plasticizer/extender oil has a considerably higher market value than the fuel grade oil produced by conventional pyrolysis method.

Figure 1:
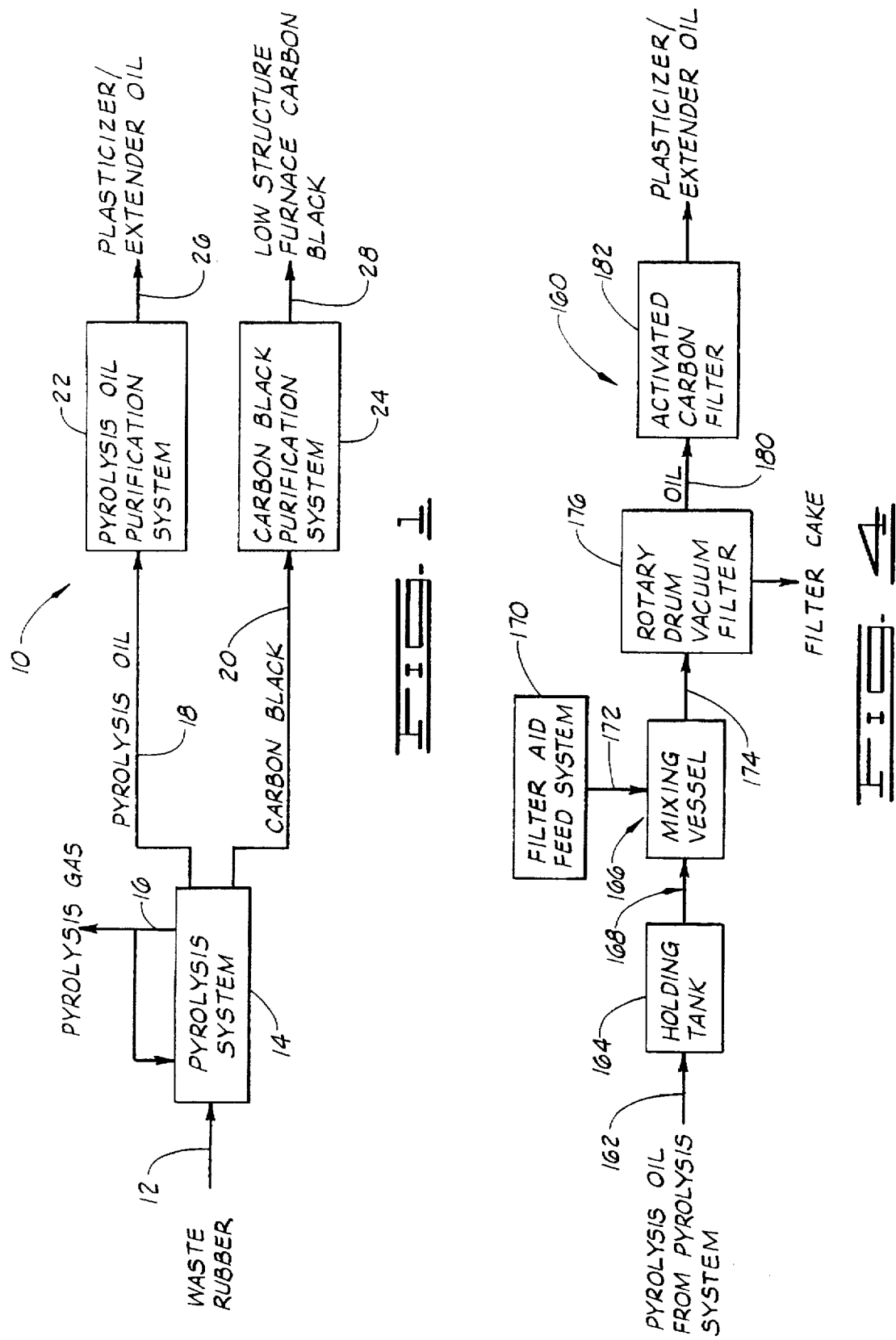
FIG. 1 is a schematic illustration of the waste rubber processing system of the present invention comprising a waste rubber pyrolysis system, a system for purifying and refining carbon black produced by the pyrolysis system, and a system for purifying pyrolysis oil produced by the pyrolysis system.

Turning now to the drawings in general and to FIG. 1 in particular, there is shown schematically therein the waste rubber processing system 10 of the present invention. First, a supply of material to be processed is provided. In most instances the starting material will be waste rubber from scrap tires. However, other sources of waste rubber may be processed according to this invention.

The waste rubber 12 is first fed into a pyrolysis system 14 wherein it is pyrolyzed to produce pyrolysis gas 16, pyrolysis oil 18 and carbon black 20. In a conventional manner, the pyrolysis gas 16 is recycled in the pyrolysis system 14 as fuel or collected and marketed as fuel grade gas. In accordance with the present invention, the pyrolysis oil 18 is processed through a pyrolysis oil purification system 22 and the carbon black 20 is processed through a carbon black purification system 24. The pyrolysis oil purification system 22 of this invention produces a plasticizer/extender oil 26, and the carbon black purification system 24 produces a low structure furnace carbon black 28.

The Pyrolysis System

Various waste rubber pyrolysis systems and methods are known, and virtually all of them produce pyrolysis oil and carbon black which can be treated advantageously in accordance with the carbon black purification system and the pyrolysis oil purification system of this invention. For example, adequate pyrolysis of waste rubber may be obtained by using the apparatus disclosed in U.S. Pat. No. 4,308,103 entitled APPARATUS FOR THE PYROLYSIS OF COMMINUTED SOLID CARBONIZABLE MATERIALS, which is an improvement of the apparatus shown in U.S. Pat. No. 4,123,332 for PROCESS AND APPARATUS FOR CARBONIZING A COMMINUTED SOLID CARBONIZABLE MATERIAL.

Figure 2:
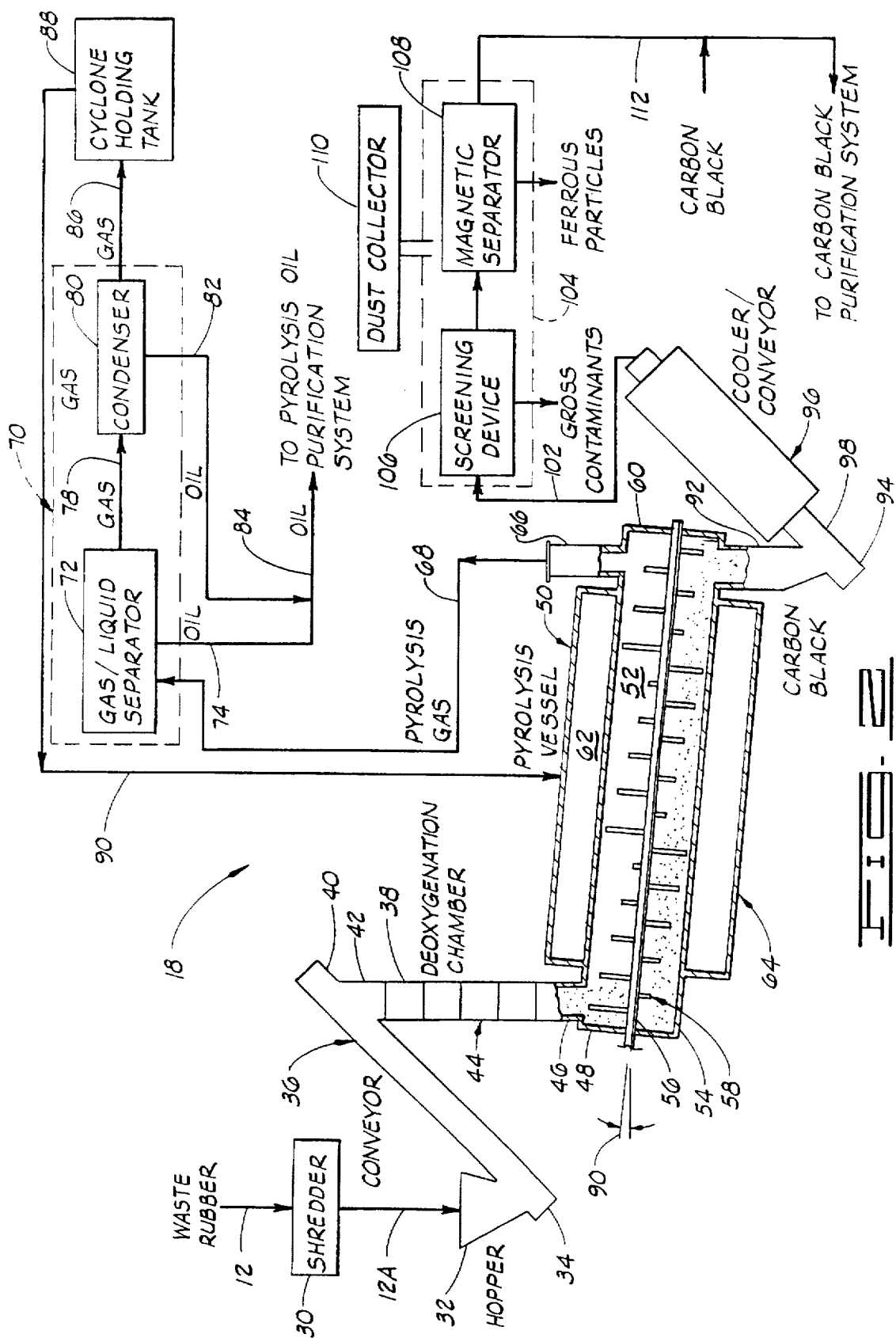
FIG. 2 is a diagrammatic illustration of a waste rubber processing system in accordance with the present invention.

Though the present invention is not limited to any particular pyrolysis system, a preferred pyrolysis system 14 is depicted semi-schematically in FIG. 2 to which attention now is directed. As shown in the drawing, the waste rubber 12 is delivered into a shredder 30 which shreds the material into suitably sized fragments for pyrolysis. As used herein, the term "shredder" denotes any of a variety of size reduction devices which produces any shape of pieces or fragments. Similarly, the term "shred" denotes any size or shape of fragment which is acceptable by the selected pyrolysis system. For use in the system described herein, scraps having a major dimension of about 1 inch to about 2 inches are preferred.

The shredded waste rubber 12A is fed into a hopper 32 which is connected to the inlet end 34 of a conveyor 36. The conveyor 36 is adapted to feed or meter the waste rubber shreds 12A in a continuous, controlled manner into a deoxygenator 38. To this end the outlet end 40 of the conveyor 36 is connected to the inlet end 42 of the deoxygenator 38. The conveyor 36 may be an auger type conveyor, but preferably is a bucket or flight conveyor mechanism.

As used herein, "pyrolysis" means the decomposition of waste rubber under heat and in the absence of oxygen into hydrocarbon vapors. Accordingly, the deoxygenator 38 is adapted to receive the shredded waste rubber from the conveyor 36 and to deoxygenize the rubber by removing the oxygen containing gases therefrom. A suitable deoxygenator is an apparatus comprising a plurality of heated, non-jamming air locks 44 vertically arranged so that the apparatus forms a gravity packed feed column.

The bottom or outlet end 46 of the deoxygenator 38 feeds the deoxygenated rubber shreds into the inlet end 48 of a pyrolysis vessel 50. The pyrolysis vessel 50 is comprised of an inner pyrolysis chamber 52 defined by an elongate vessel 54. A screw conveyor comprising a shaft 56 supporting helically arranged spikes 58 is mounted longitudinally inside the vessel 54. Thus, as the shaft is rotated by a motor (not shown), the rubber shreds are agitated and moved toward the opposing or outlet end 60 of the elongate vessel 54.

The heat for the pyrolysis reaction occurring in the inner pyrolysis chamber 52 is supplied by combustion which occurs inside a heating chamber 62 defined by a refractory lined furnace box 64 which surrounds the elongate vessel 54. The furnace box is equipped with multiple burners which burn fuel gas in the heating chamber 62. Also included are sight ports (not shown) and an infrared temperature control mechanism which automatically regulates the burners.

The end products of the pyrolysis reaction accumulate at the outlet end 60 of the elongate vessel 54. Gas exits the pyrolysis chamber 52 through a port 66 and is conducted by a conduit 68 to an oil/gas separator assembly 70. The oil/gas separator assembly preferably comprises a baffled separator 72 which separates pyrolysis oil from pyrolysis gas. Oil is removed from the separator 72 through the conduit 74. Gas from the baffled separator 72 is fed through a conduit 78 to a condenser 80 where more oil is separated from the gas. The oil is removed from the condenser 80 through the conduit 82. The conduits 82 and 74 merge to form a main oil removal conduit 84.

The pyrolysis oil leaving the condenser 80 and the separator 72 is an amber-colored oil of poor clarity due to suspended solids and other contaminants. This oil product can be sold as fuel oil. However, in accordance with the present invention this pyrolysis oil instead is delivered via the conduit 84 to a pyrolysis oil purification system yet to be described.

Gas from the condenser 80 may be transferred by the conduit 86 to a pyrolysis gas holding tank such as a cyclone holding tank 88. From the cyclone holding tank 88 gas can be recycled through the line 90 to fuel the burners in the furnace jacket 50. Gas from the cyclone holding tank 88 may also be sold as high BTU fuel gas or, alternately, simply may be flared to the atmosphere.

The solid end product of the pyrolysis reaction is granular carbon black mixed with impurities such as nylon, polyester and fiberglass fibers and metal fragments. The granular carbon black collects at the bottom of the outlet end 60 of the elongate vessel 54. To assist in movement of the solid matter towards the outlet end 60, the reaction vessel 50 may be supported at an angle to the horizontal of about 5 degrees as indicated at the arrows 90. An outlet funnel 92 receives the carbon black mixture from the outlet end 60 and delivers the gravity packed mixture to the inlet end 94 of a conveyor assembly 96.

The conveyor 96 may be an auger or screw conveyor 98 and preferably is surrounded by a water or cooling jacket 100 which will cool the hot carbon black as it is conveyed therethrough. The cooled carbon black then is conducted through the conduit 102 to a carbon black screening assembly 104. The screening assembly 104 comprises a screening device 106, which separates and removes oversized fragments and gross contaminants, such as fiberglass and nylon filaments, and a magnetic separator 108 which separates and removes ferrous contaminants such as metal particles. A dust collector 110 is provided in the screening assembly 104 to capture airborne particulate matter produced by the screening device 106 and the magnetic separator 108. Partially purified granular carbon black leaving the screening assembly 104 is conveyed by a carbon black exit conduit 112 to a carbon black refinement and purification system.

The Carbon Black Refinement and Purification System

In accordance with the present invention, granulated carbon black produced as an end product of waste rubber pyrolysis is refined and purified. A preferred refinement and purification system 118 is shown schematically in FIG. 3 to which reference now is made. The granular carbon black is transferred through the main carbon black exit conduit 112 (see also FIG. 2) to a suitable conveyor 120 which delivers the carbon black to an enclosed carbon black holding tank 122. From the holding tank 122, the carbon black is delivered to the inlet port 124 of a mill 126 to reduce the size of the carbon black particles to a selected average size. For example, the average size of the aggregates of granular carbon black produced by the pyrolysis system may be about 60 to 80 mesh (about 0.007–0.010 inch). The mill may be selected to reduce the average aggregate size to less than about 325 mesh (about 0.001 inch).

An air-powered fluid energy jet mill assembly is preferred as jet mills are capable of producing very fine powders. A suitable jet mill is a JET PULVERIZER brand marketed by The Jet Pulverizer Company (Morristown, N.J.).

The input to the jet mill 126 should be carefully metered, and a star valve 128 with variable drive is ideal for this purpose. The jet mill 126 is equipped with a sizer device 130 which screens the milled carbon black leaving the mill. The sizer device 130 recycles oversized particles to the inlet port 124 of the mill 126 through the return conduit 132. Particles escaping the sizer device 130 are delivered through a conduit 134 to a conveyor 136. To produce the 325 mesh size aggregates a 325 mesh screen may be employed in the sizer 130.

The conveyor 136 receiving milled carbon black from the jet mill 126 preferably is an enclosed screw conveyor to prevent escape of airborne carbon particles. The conveyor 136 conveys the powder fine carbon black to a screening device adapted to remove oversized particulate contaminants, such as fiberglass, nylon and silicon dioxide. The preferred screening device comprises an oscillating fine screen deck 140. The screening deck is driven by a small amplitude drive which produces a high frequency, low magnitude movement of the particles. A preferred fine screening deck is a ROTEX type oscillating screener which is commercially available. The oversized particulate contaminants captured by the screening deck 140 may be disposed of at any solid waste non-hazardous land fill.

The milled carbon black also is processed for the removal of fine ferrous particles which were not removed in the gross screening assembly 104 in the pyrolysis system 18 (see FIG. 1). To this end, the carbon black purification and refinement system 118 preferably includes a magnetic separator 142 which removes ferrous particles such as iron, nickel and cobalt particles. Various reliable magnetic separators are commercially available. The ferrous particles removed by the separator 142 may be collected and sold as scrap steel.

The milled, purified carbon black is received from the magnetic separator 142 into a conveyor 144 which in turn delivers the powder to an enclosed carbon black storage vessel 146. A weighing and bagging assembly 150 may be included for receiving the carbon black powder from the storage vessel 146 and automatically packaging the powder for market in preselected amounts, such as 50 and 100 pound bags or larger containers. Alternately, the carbon black powder may be processed in a pelletizer (not shown), and the pellets then delivered to the weighing and bagging assembly 150.

The milling, separating and conveying equipment employed in this system usually will generate dust or airborne carbon and contaminant particles. Accordingly, it is preferred in most instances to enclose the entire system and to provide the enclosure with a dust collection system (not shown in the drawings).

The milled and purified carbon black produced by this system compares favorably to carbon black produced by conventional pyrolysis systems. This milled, purified carbon black has a lower tar content and exhibits a lower heat loss factor at 105 degrees Centigrade. The ash content is reduced primarily due to the more efficient removal of fiberglass, nylon and silicon dioxide particles, and the percentage of fixed carbon is greater.

The Pyrolysis Oil Purification System

With reference now to FIG. 4, the pyrolysis oil purification system of the present invention will be described. The pyrolysis oil purification system 160 receives pyrolysis oil into a pyrolysis oil holding tank 164 from the main oil exit conduit 84 in the pyrolysis system 18 (see FIG. 2).

The pyrolysis oil is transferred to a mixing vessel 166 through the conduit 168. This mixing vessel 166 is adapted to mix the pyrolysis oil with a filter aid under conditions which permit the filter aid to attract contaminants in the oil. A mixing vessel equipped with a propeller type agitator device is ideal. For automatic, regulated feed of filter aid into the mixing vessel 166, the system 160 includes a filter aid feed system 170 which holds the filter aid and weighs and dispenses the filter aid at a selected rate to the mixing vessel 166 through the conduit 172.

The contaminants sought to be removed from the oil by the filter aid include suspended carbon black particles. A preferred filter aid for this purpose is diatomaceous earth, and most preferably kieselguhr.

Once the filter aid and the contaminants have formed aggregates, the pyrolysis oil containing the filter aid/ contaminant aggregates is delivered by a pump (not shown) through the conduit 174 to a filter aid removal assembly for removal of the aggregates. In most instances the filter aid removal assembly will be a rotary drum vacuum filter 176 which comprises a filter, vacuum pump and condenser. The filter 176 removes the filter cake comprising primarily filter aid/contaminant aggregates. The filter cakes can be disposed of in a municipal solid waste land fill.

The remaining pyrolysis oil is pumped through the conduit 180 to a colloidal/colorant removal assembly. The colloidal/colorant removal assembly is adapted to remove colloidal contaminants and color bodies. Preferred for this process step is an activated carbon bed filter 182. In most cases, the carbon bed filter assembly 182 will comprise a dual cartridge system in which the cartridges alternate between a regeneration mode and a filtering mode so that continuous filtering can be maintained.

The clear, colorless oil leaving the activated carbon filter bed 182 may be pumped into a storage facility from which it can be pumped into tank trucks or drums for sale. It will be noted that pyrolysis oil is a solvent with a relatively low flash point. Accordingly, the purified oil should be stored in a facility which is physically separate and remote from the pyrolysis system.

The purified oil produced by this system compares favorably to pyrolysis oil produced by conventional pyrolysis systems. The purified oil has a lower viscosity. Suspended solids are eliminated and virtually all color is removed, producing an oil characterized by water white color and clarity. This "bright stock" has a market value substantially greater than pyrolysis oil.

Now it will be appreciated that the waste rubber processing system and method of the present invention provides an environmentally clean process for disposing of large volumes of waste rubber. The only effluent of the system is exhaust gas from the heater of the pyrolysis system, which is safe and can be flared to the atmosphere without hazard. The only solid waste products produced are the nylon, polyester and fiberglass particles which are inert and can be disposed of in any solid waste non-hazardous land fill. No liquid waste is generated.

The other end products of the system are marketable. The milled, purified carbon black is useful in molded rubber and plastic formulations, as well as in the making of inks, adhesives, paints and other coatings. The bright stock has applications as a plasticizer or extender oil in molded rubber and plastic formulations. Thus, in accordance with this invention, a huge volume of solid waste material which heretofore has represented an environmental disposal problem instead is feed material for an efficient, economically sound process for making marketable compounds.

Changes may be made in the combination and arrangement of the various parts, elements, steps and procedures described herein without departing from the spirit and scope of the invention as defined in the following claims.

What is claimed is:

1. A method for recovering marketable end products from waste rubber, comprising the steps of:
   pyrolyzing waste rubber shreds to produce pyrolysis oil and carbon black;
   milling the carbon black mixture to produce milled carbon black particles of a selected average particle size;
   removing oversized contaminant particles from the milled carbon black;
   removing ferrous contaminants from the milled carbon black;
   mixing the pyrolysis oil with a filter aid selected to attract particulate contaminants in the pyrolysis oil under conditions which permit the filter aid to form aggregates with the particulate contaminants;
   removing the filter aid/contaminant aggregates from the pyrolysis oil;
   removing colorant contaminants from the pyrolysis oil; and
   removing colloidal contaminants from the pyrolysis oil.

2. The method of claim 1 wherein the filter aid is diatomaceous earth.

3. The method of claim 2 wherein the filter aid is kieselguhr.

4. The method of claim 1 wherein the removal of filter aid/contaminant aggregates is carried out using a rotary drum vacuum filter.

5. The method of claim 1 wherein the removal of colorant and colloidal contaminants from the impure pyrolysis oil is carried out using activated carbon.

6. The method of claim 1 wherein the milling is carried out by a fluid energy jet mill.

7. The method of claim 1 wherein the method further comprises the step of weighing the milled, purified carbon black.

8. The method of claim 7 wherein the method further comprises the step of packaging the milled, purified carbon black.

9. The method of claim 1 wherein the method further comprises the step of packaging the milled, purified carbon black.

10. The method of claim 1 wherein the step of removal of oversized contaminant particles from the milled carbon black is carried out by using an oscillating fine screening deck.

11. The method of claim 1 wherein the step of removal of the ferrous articles from the milled carbon black is carried out using a magnetic separator.

12. The method of claim 1 wherein the oversized contaminants are further defined as comprising fiberglass fragments.

13. The method of claim 1 further comprising the step of shredding waste rubber fragments into shreds prior to the pyrolysis step.

14. A method for purifying pyrolysis oil produced by waste rubber pyrolysis, comprising the steps of:
   mixing the pyrolysis oil with a filter aid selected to attract particulate contaminants in the pyrolysis oil under conditions which permit the filter aid to form aggregates with the particulate contaminants;
   removing the filter aid/contaminant aggregates from the pyrolysis oil;
   removing colloidal contaminants from the pyrolysis oil; and
   removing colorant contaminants from the pyrolysis oil.

15. The method of claim 14 wherein the filter aid is diatomaceous earth.

16. The method of claim 15 wherein the filter aid is kieselguhr.

17. The method of claim 14 wherein the removal of filter aid/contaminant aggregates is carried out using a rotary drum vacuum filter.

18. The method of claim 14 wherein the removal of colorants and colloidal contaminants from the pyrolysis oil is carried out using activated carbon.

19. A system for processing waste rubber comprising:
   a waste rubber pyrolysis system, comprising:
      a hopper for containing waste rubber shreds;
      a deoxygenator adapted to receive waste rubber shreds from the hopper and to remove oxygen from the waste rubber;

a conveyor adapted to dispense at a controlled rate waste rubber shreds from the hopper to the deoxygenation system;

a pyrolysis vessel adapted to receive deoxygenated waste rubber from the deoxygenator and to pyrolyze the deoxygenated waste rubber, wherein the pyrolysis reaction produces end products comprising pyrolysis oil and carbon black;

an oil/gas separator assembly adapted to separate the pyrolysis oil and the pyrolysis gas;

a pyrolysis gas holding tank for receiving pyrolysis gas from the oil/gas separator assembly; and a carbon black screening assembly adapted to remove gross contaminants and ferrous particles from the carbon black received from the pyrolysis vessel;

a pyrolysis oil purification system comprising:

a pyrolysis oil holding tank for receiving pyrolysis oil from the oil/gas separator assembly in the pyrolysis system;

a mixing vessel adapted to receive pyrolysis oil from the pyrolysis oil holding tank and to mix the pyrolysis oil with a filter aid under conditions which permit particulate contaminants in the pyrolysis oil to form aggregates with the filter aid;

a filter aid removal assembly adapted to receive the mixture of pyrolysis oil, filter aid and filter aid/particulate contaminant aggregates from the mixing vessel and to remove the filter aid and filter aid/particulate contaminant aggregates from the pyrolysis oil;

a colloidal/colorant removal assembly adapted to receive the pyrolysis oil from the filter aid removal assembly and to remove colorant and colloidal contaminants from the pyrolysis oil;

a carbon black purification and refinement system comprising:

an enclosed carbon black holding tank for receiving carbon black from the pyrolysis system;

a mill for milling the carbon black into particles of a selected average size;

a valve adapted to dispense carbon black from the carbon black holding tank to the mill at a controlled rate;

a screening device adapted to separate oversized contaminants from the milled carbon black;

a magnetic separator adapted to remove ferrous particles from the milled carbon black; and a carbon black storage vessel for collecting purified milled carbon black.

20. The system of claim 19 further comprising a recycling assembly adapted to receive the product of the mill, to separate carbon black aggregates larger than a selected size and to return the larger carbon black aggregates to the mill.

21. The system of claim 19 wherein the oil/gas separator assembly of the pyrolysis system comprises:

a gas/liquid separator adapted to separate pyrolysis oil from pyrolysis gas received from the pyrolysis vessel; and a condenser adapted to receive pyrolysis gas from the gas/liquid separator and to remove additional pyrolysis oil therefrom.

22. The system of claim 19 wherein the carbon black screening assembly of the pyrolysis system comprises:

an oscillating fine screening deck for separating oversized contaminant particles from carbon black received from the pyrolysis vessel; and a magnetic separator for separating ferrous particles from carbon black received from the pyrolysis vessel.

23. The system of claim 19 wherein the filter aid removal assembly in the pyrolysis oil purification system comprises a rotary drum vacuum filter.

24. The system of claim 19 wherein the colloidal/colorant removal assembly in the pyrolysis oil purification system comprises activated carbon.

25. The system of claim 20 wherein the mill in the carbon black purification and refinement system comprises a fluid energy jet mill.

26. The system of claim 19 wherein the carbon black purification and refinement system further comprises an automatic weighing and bagging system adapted to receive the milled, purified carbon black and package it in selected amounts by weight.

27. The system of claim 19 wherein the waste rubber pyrolysis system further comprises a shredder assembly adapted to shred waste rubber fragments into a selected average size and to dispense the shreds to the hopper.

28. The system of claim 19 wherein the valve in the carbon black purification and refinement system is further defined as a star valve device with a variable drive.

29. A system for purifying pyrolysis oil obtained from a waste rubber pyrolysis system comprising:

a pyrolysis oil holding tank adapted to contain pyrolysis oil;

a mixing vessel adapted to receive pyrolysis oil from the pyrolysis oil holding tank and to mix the pyrolysis oil with a filter aid under conditions which permit particulate contaminants in the pyrolysis oil to form aggregates with the filter aid;

a filter aid removal assembly adapted to receive the mixture of pyrolysis oil, filter aid and filter aid/particulate contaminant aggregates from the mixing vessel and to remove the filter aid and filter aid/particulate contaminant aggregates from the pyrolysis oil; and a colloidal/colorant removal assembly adapted to receive the pyrolysis oil from the filter aid/particulate contaminant aggregate filter assembly and to remove colorant and colloidal contaminants from the pyrolysis oil.

30. The system of claim 29 wherein the filter aid removal assembly comprises a rotary drum vacuum filter.

31. The system of claim 29 wherein the colloidal/colorant removal assembly comprises activated carbon.

32. A system for processing waste rubber comprising:

means for pyrolyzing waste rubber shreds to produce pyrolysis oil and carbon black;

means for milling the carbon black mixture to produce milled carbon black particles of a selected average particle size;

means for removing oversized contaminant particles from the milled carbon black;

means for removing ferrous contaminants from the milled carbon black;

means for mixing the pyrolysis oil with a filter aid selected to attract particulate contaminants in the pyrolysis oil under conditions which permit the filter aid to form aggregates with the particulate contaminants;

means for removing the filter aid/contaminant aggregates from the pyrolysis oil; and means for removing colorant contaminants from the pyrolysis oil.

* * * * *

UNITED STATES PATENT AND TRADEMARK OFFICE
CERTIFICATE OF CORRECTION

PATENT NO. : 5,894,012
DATED : April 13, 1999
INVENTOR(S) : Gilbert W. Denison

It is certified that error appears in the above-indentified patent and that said Letters Patent is hereby corrected as shown below:

Claim 11, line 2, delete "articles" and substitute therefor --particles--.

Column 5, line 48, delete "Morristown" and substitute therefor --Moorestown--.

Signed and Sealed this

Seventh Day of December, 1999

Attest:

Q. TODD DICKINSON

Attesting Officer

Acting Commissioner of Patents and Trademarks